(12) United States Patent
Tateno

(10) Patent No.: US 9,651,852 B2
(45) Date of Patent: *May 16, 2017

(54) LIGHT SOURCE DEVICE AND PROJECTOR

(71) Applicant: Seiko Epson Corporation, Tokyo (JP)

(72) Inventor: Yasushi Tateno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/085,806

(22) Filed: Mar. 30, 2016

(65) Prior Publication Data

US 2016/0209737 A1    Jul. 21, 2016

Related U.S. Application Data

(63) Continuation of application No. 13/888,740, filed on May 7, 2013, now Pat. No. 9,335,615.

(30) Foreign Application Priority Data

May 23, 2012    (JP) ................................. 2012-117256

(51) Int. Cl.
*G03B 21/16* (2006.01)
*F21V 7/00* (2006.01)
(Continued)

(52) U.S. Cl.
CPC ................ *G03B 21/16* (2013.01); *F21V 7/00* (2013.01); *G03B 21/005* (2013.01);
(Continued)

(58) Field of Classification Search
CPC .. G03B 21/16; G03B 21/145; G03B 21/2086; H04N 9/3141; H04N 9/3144
See application file for complete search history.

(56) References Cited

U.S. PATENT DOCUMENTS 7,179,048 B2    2/2007 Huang et al.
7,210,825 B2    5/2007 Watanabe et al.
(Continued)

FOREIGN PATENT DOCUMENTS

JP    H10-106307    4/1998
JP    2005-10505 A    1/2005
(Continued)

OTHER PUBLICATIONS

Non-Final Office Action received in U.S. Appl. No. 13/888,740, May 22, 2015.
(Continued)

*Primary Examiner* — Sultan Chowdhury
(74) *Attorney, Agent, or Firm* — ALG Intellectual Property, LLC

(57) ABSTRACT

A light source device includes a light source, a reflector that reflects light emitted from the light source, a light source housing accommodating the light source and the reflector and including a plurality of introduction ports through which cooling air is introduced, an introduction port forming portion having a plurality of outlet ports communicating with the plurality of introduction ports, an opening and closing device opening and closing the plurality of introduction ports, and a holding unit having the introduction port forming portion accommodating the opening and closing device. The light source device is used in a projector having a cooling device. The holding unit is fixed to an external housing of the projector and supports the reflector housing in such a manner as to be freely attachable and detachable.

8 Claims, 14 Drawing Sheets

(51) Int. Cl.
*H04N 9/31* (2006.01)
*G03B 21/00* (2006.01)
*G03B 21/14* (2006.01)
*G03B 21/20* (2006.01)

(52) U.S. Cl.
CPC ....... *G03B 21/145* (2013.01); *G03B 21/2066* (2013.01); *H04N 9/3144* (2013.01)

(56) References Cited

U.S. PATENT DOCUMENTS

| | | |
|---|---|---|
| 7,216,987 B2 | 5/2007 | Fujimori et al. |
| 8,011,788 B2 | 9/2011 | Chang |
| 8,506,088 B2 | 8/2013 | Liao |
| 8,511,834 B2 | 8/2013 | Kobayashi et al. |
| 8,641,201 B2 | 2/2014 | Ko et al. |
| 2007/0115436 A1* | 5/2007 | Takeda ............ G03B 21/16 353/57 |
| 2009/0141249 A1 | 6/2009 | Yanagisawa et al. |
| 2010/0103382 A1 | 4/2010 | Onodera et al. |
| 2011/0194080 A1 | 8/2011 | Hoshino et al. |
| 2012/0086919 A1 | 4/2012 | Lin et al. |
| 2013/0265553 A1* | 10/2013 | Kotani ............ G03B 21/2013 353/52 |

FOREIGN PATENT DOCUMENTS

| | | |
|---|---|---|
| JP | 2011-123095 A | 6/2011 |
| JP | 2011-203515 A | 10/2011 |
| WO | WO-2010-050048 A | 5/2010 |

OTHER PUBLICATIONS

Notice of Allowance and Notice of Allowability received in U.S. Appl. No. 13/888,740, Dec. 24, 2015.

* cited by examiner

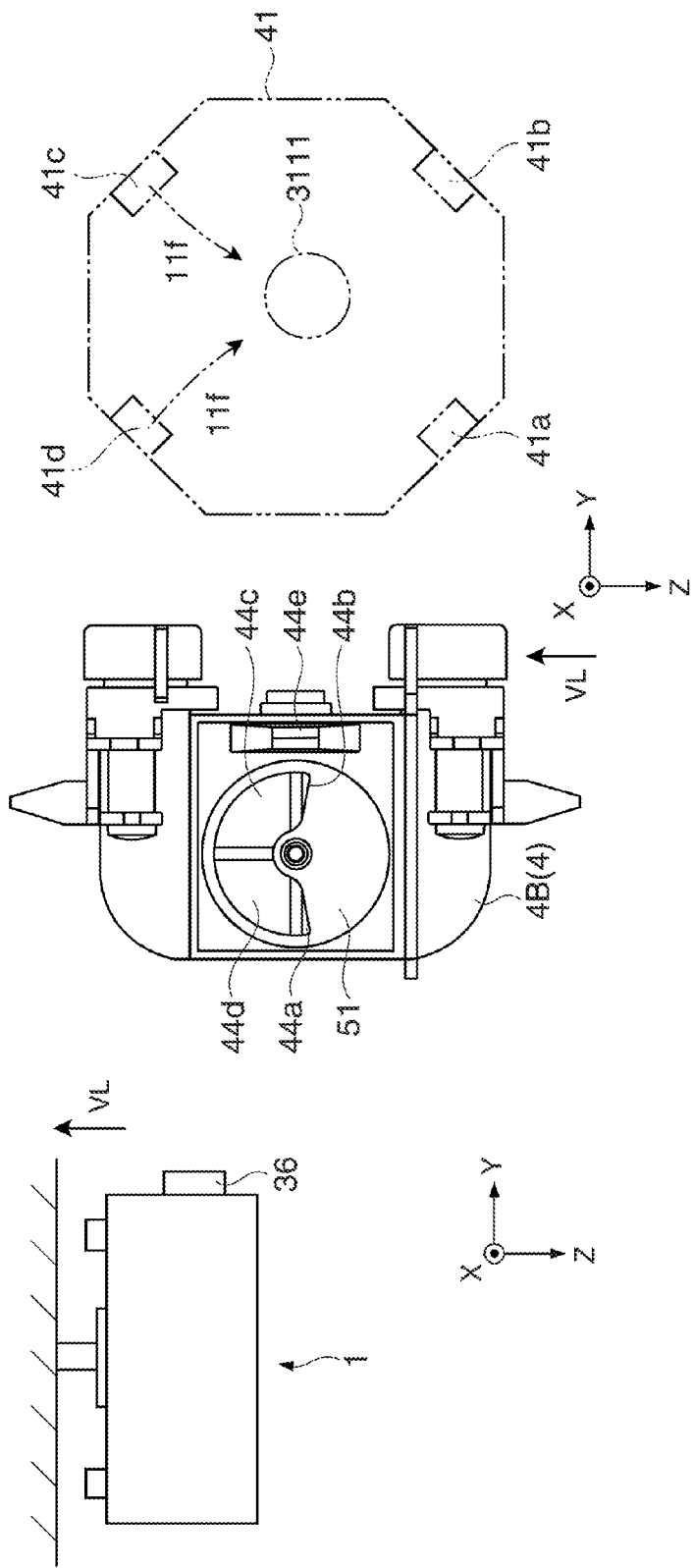

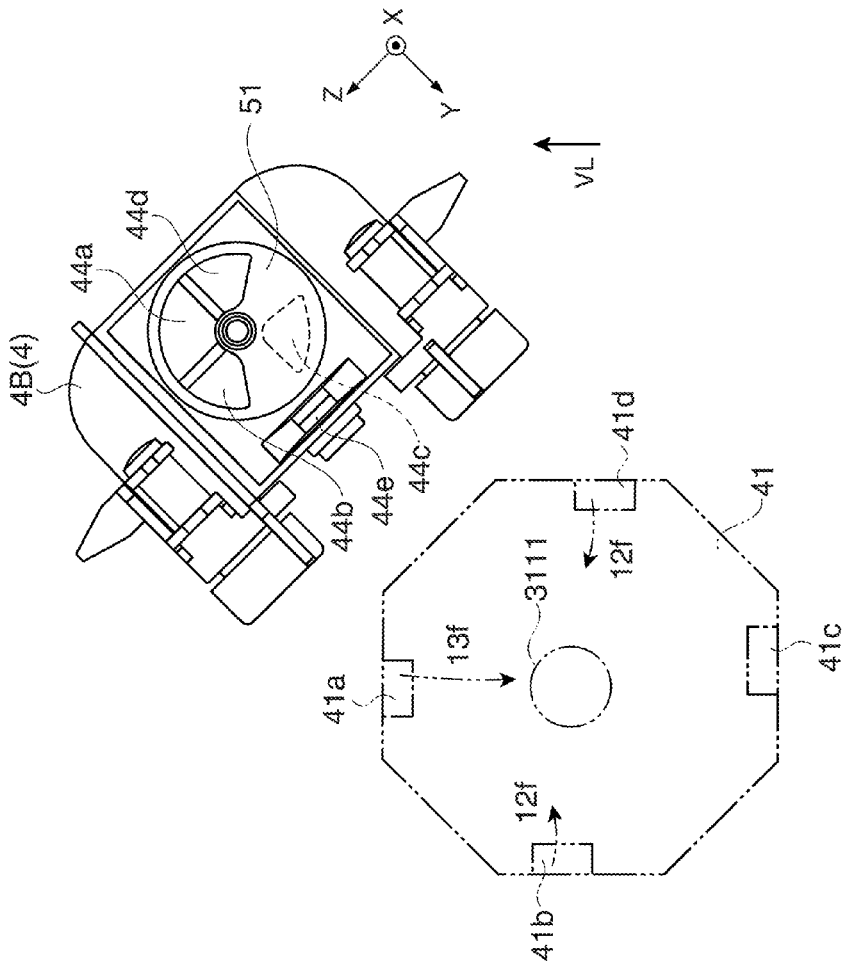
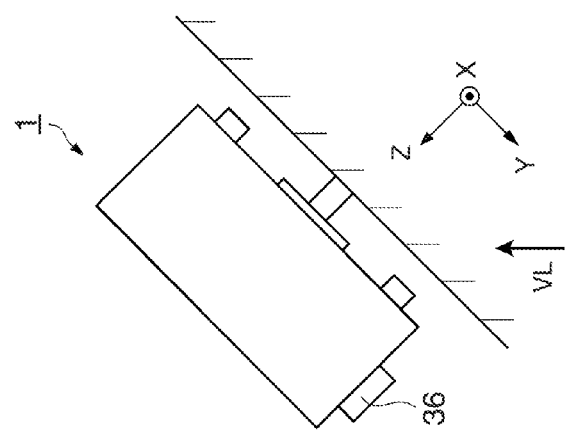
FIG. 11B
FIG. 11A

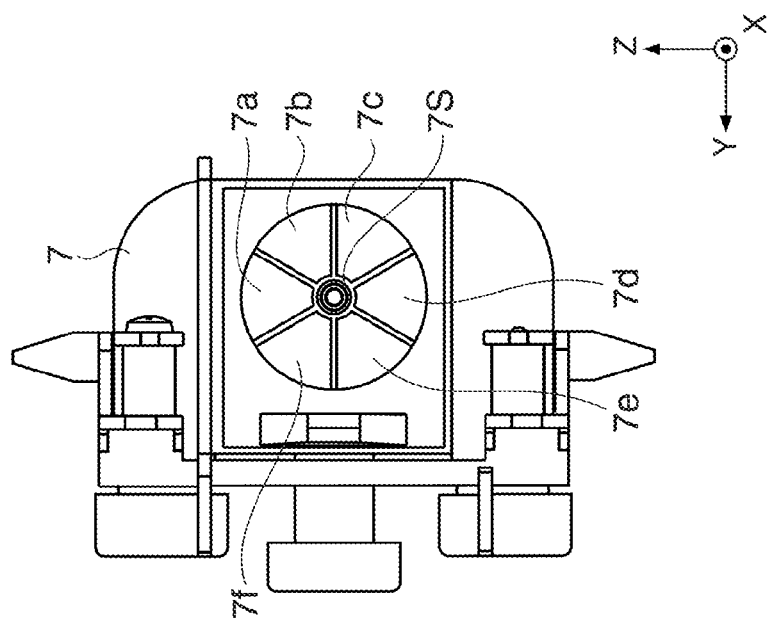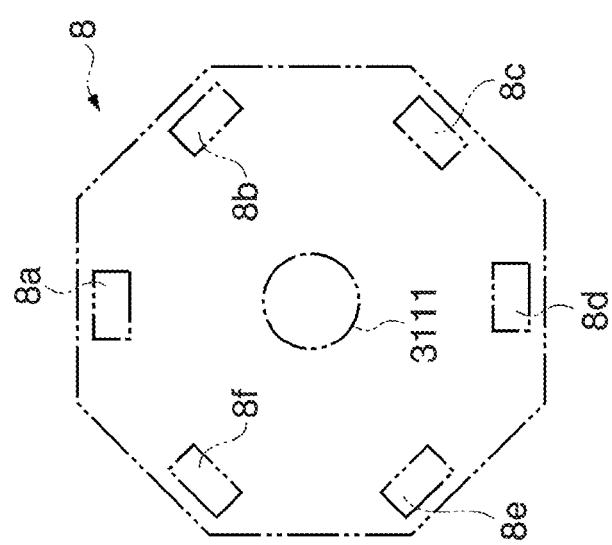
FIG. 12

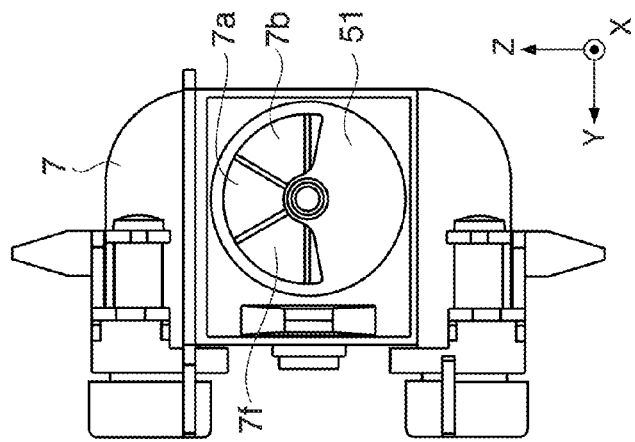
FIG. 13B
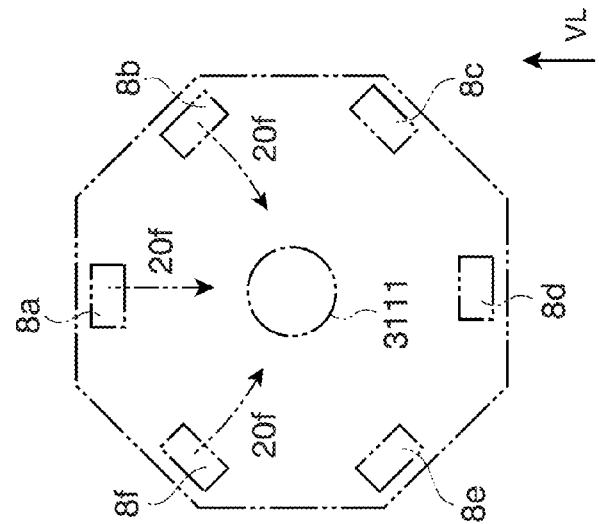
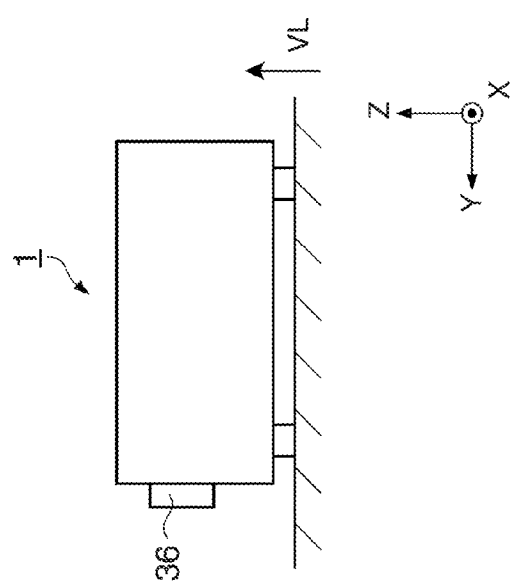
FIG. 13A

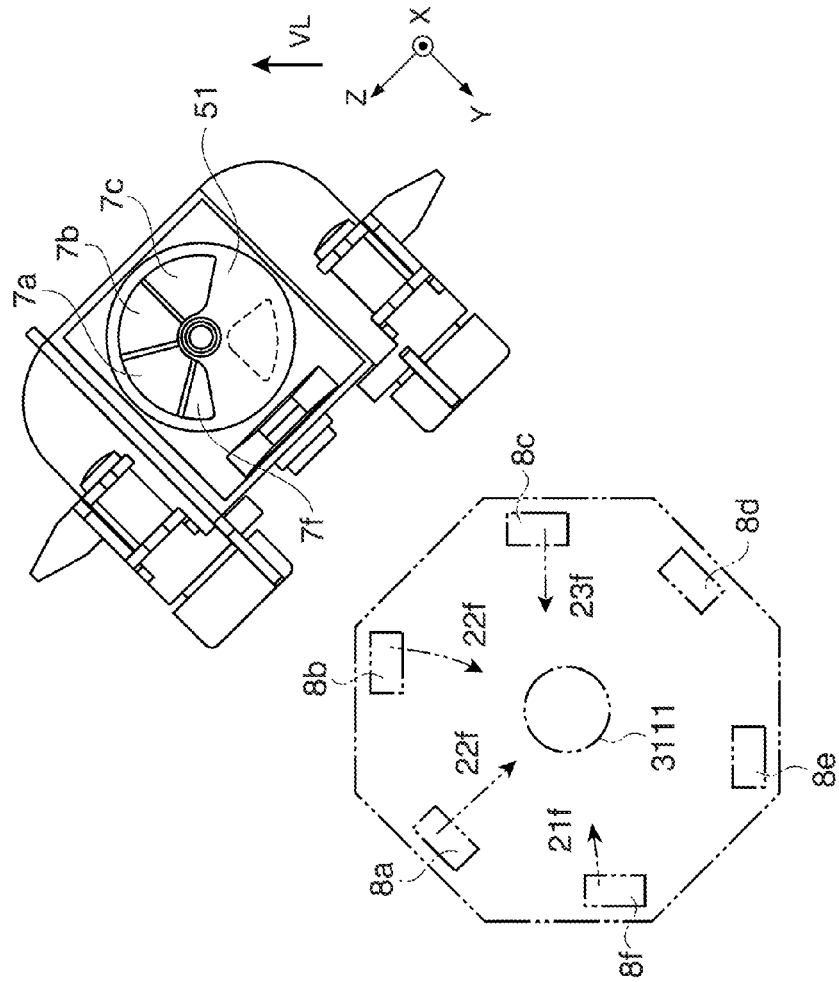
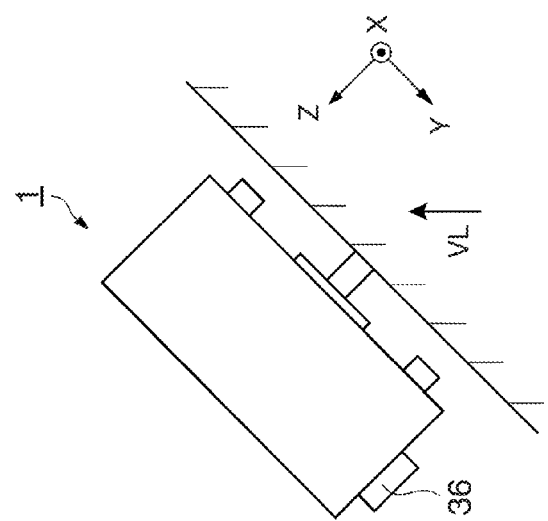
FIG. 14B
FIG. 14A

LIGHT SOURCE DEVICE AND PROJECTOR

The present application is a continuation application of U.S. patent application Ser. No. 13/888,740 filed May 7, 2013, which claims priority from Japanese Patent Application No. 2012-117256 filed May 23, 2012, which are expressly incorporated by reference herein.

BACKGROUND

1. Technical Field

The present invention relates to a light source device and a projector.

2. Related Art

Heretofore, a projector which modulates light emitted from a light source according to image information, and projects the modulated light onto a projection surface such as a screen is known. This type of the projector includes a light source constituted by an extra-high pressure mercury lamp or the like so as to display a projected image with high vividness. The light source generates heat at the time of emission of light, and therefore needs to be cooled. Currently, there have been proposed technologies capable of achieving efficient cooling for the light source of the projector installed either in a standing position placed on a desk or the like, or in a hanging position attached to a ceiling or the like (for example, see JP-A-2005-10505).

According to the structure of a projector disclosed in JP-A-2005-10505, a light source is cooled by using descending air with a plurality of air channels within a light source lamp housing opened and closed by operation of a shutter rotatable by gravity, under the installation condition of the projector either in the standing position or the hanging position reversed in the up-down direction with respect to the standing position.

According to the technology disclosed in JP-A-2005-10505, however, the shutter is not necessarily rotated in a desired direction when the projector is installed in positions other than the standing position and the hanging position, such as a position rotated through 90 degrees from the standing position, and a position inclined to the standing position. In this case, there is a possibility that the cooling air is difficult to reach the light source. Moreover, under the positions other than the standing position and the hanging position, an air outlet port through which the cooling air flows out is not necessarily positioned above the light source. In this condition, the light source is not sufficiently cooled by the descending air. In recent years, there is a demand for development of such a projector capable of projecting images in positions other than the standing position and the hanging position so as to widen the range of places and occasions where the projector is used. However, according to the technology disclosed in JP-A-2005-10505, it is difficult to efficiently cool the light source in positions other than the standing position and the hanging position.

SUMMARY

An advantage of some aspects of the invention is to solve at least a part of the aforementioned problems, and the invention can be implemented as the following modes or application examples.

This application example is directed to a light source device which includes: a light source; a reflector that reflects light emitted from the light source; a light source housing accommodating the light source and the reflector, and including a plurality of introduction ports through which cooling air is introduced, and a plurality of outlet ports communicating with the plural corresponding introduction ports, the outlets ports through which the introduced cooling air goes out; and an opening and closing device opening and closing the plural introduction ports. The plural introduction ports are disposed around a center shaft of the opening and closing device. The plural outlet ports are disposed along an opening of the reflector. The opening and closing device has a rotating member which selectively opens and closes the plural introduction ports by rotating around the center shaft in accordance with the position of the light source device.

According to this structure, the light source device includes the light source housing and the opening and closing device. Thus, cooling air introduced through the opened introduction port can be discharged through the outlet port communicating with this introduction port, and supplied to the light source. Moreover, the plural introduction ports are selectively opened and closed in accordance with the position of the light source device. Accordingly, cooling air can be supplied to the light source substantially in the same direction with respect to the vertical direction regardless of the position of the light source device within the range of the direction of rotation around the shaft extending along the optical axis of the light source. For example, in the case of a discharge-type light source device, the center position of an arc generated between a pair of opposed electrodes shifts upward in the vertical direction from the center between the electrodes due to heat convection produced by heat generated by light emission. Therefore, when the light source device described above is used, cooling air can be supplied to the light source substantially in the same direction with respect to the vertical direction, and thus can cool the light source in a stable condition even at the time of positional change of the light source device.

In the light source device of the application example, it is preferable that the rotating member opens the introduction port which communicates with the outlet port of the plural outlet ports positioned on the upper side of the light source device in the vertical direction, and closes the introduction port which communicates the outlet port positioned on the lower side.

According to this structure, the light source can be cooled from above in the vertical direction regardless of the position of the light source device. Thus, cooling air can be intensively supplied toward the upper part of the light source in the vertical direction which is easily heated when the light source is a discharge-type light source, for example. This structure can achieve efficient cooling for the light source.

In the light source device of the application example, it is preferable that the rotating member rotates by gravity to selectively open and close the plural introduction ports.

According to this structure, the introduction ports can be selectively opened and closed by simple constitution without requiring components such as a driving unit for driving the rotating member and a controller for controlling the driving unit.

In the light source device of the application example, it is preferable that the number of the provided outlet ports is four or larger.

According to this structure, four or more outlet ports are provided. Thus, these four outlet ports can be so arranged as to surround the light source as viewed in the direction of the optical axis of the light source. This structure can supply cooling air to the light source substantially in the same direction with respect to the vertical direction, and cool the light source in a stable condition even when the position of the light source device is changed. Particularly when the four outlet ports are formed, the channel shape from the introduction ports to the outlet ports can be simplified. Moreover, the channels can be formed with high space efficiency. Accordingly, simplification of the manufacture of the parts constituting the channels, and size reduction of the light source housing both improve.

In the light source device of the application example, it is preferable that the rotating member has a circular shape in the plan view with the center of the shape located on the center shaft, and has an opening which opens any of the plural introduction ports.

According to this structure, the rotating member is constructed as above. Thus, such a structure which selectively opens and closes the plural introduction ports arranged side by side around the center shaft can be easily produced.

This application example is directed to a projector which includes: a light modulation device modulating light emitted from the light source device according to image information; a projection lens projecting the light modulated by the light modulation device; and a cooling fan delivering cooling air to the plural introduction ports.

According to this structure, the projector includes the light source device described above. In this case, the light source can be efficiently cooled in various positions of the projector including a standing position where the projector is placed on a desk surface or the like, and a hanging position where the projector is disposed in a reversed condition in the up-down direction with respect to the standing position. Accordingly, this structure realizes development of the projector which can widen the range of places and occasions where the projector is used, and allow the use of the light source device for a long period.

In the projector according to the application example, it is preferable that the light source housing has a reflector housing accommodating the light source and the reflector and including the plural outlet ports, and an introduction port forming portion including the plural introduction ports and supporting the rotating member, and the reflector housing is a part separable from the introduction port forming portion, and attachable to and detachable from the introduction port forming portion.

According to this structure, the reflector housing can be detached for replacement of the light source under the condition where the introduction port forming portion and the opening and closing device are assembled to the main body of the projector. In this case, the introduction port forming portion and the opening and closing device need not be included in the replacement components required for the replacement of the light source, wherefore the number of components required for the replacement does not increase. Moreover, the handling easiness improves by size reduction of the unit to be replaced.

BRIEF DESCRIPTION OF THE DRAWINGS

The invention will be described with reference to the accompanying drawings, wherein like numbers reference like elements.

FIGS. 10A and 10B illustrate operation and flow of cooling air according to this embodiment.

FIGS. 11A and 11B illustrate operation and flow of cooling air according to this embodiment.

FIG. 12 illustrates an introduction port forming portion and a part of an outlet port forming portion according to a modified example 1.

FIGS. 13A and 13B illustrate operation according to the modified example 1.

FIGS. 14A and 14B illustrate operation according to the modified example 1.

DESCRIPTION OF EXEMPLARY EMBODIMENTS

A projector according to an embodiment of the invention is hereinafter described with reference to the drawings.

The projector in this embodiment modulates light emitted from a light source according to image information, and enlarges and projects the light on a screen or the like. The projector is so constructed as to efficiently cool the light source in any positions within the range rotated through 360 degrees around a shaft extending along the optical axis of the light source, including a standing position placed on a desk or the like and a hanging position setting in the reversed condition in the up-down direction with respect to the standing position.

Main Structure of Projector

Figure 1:
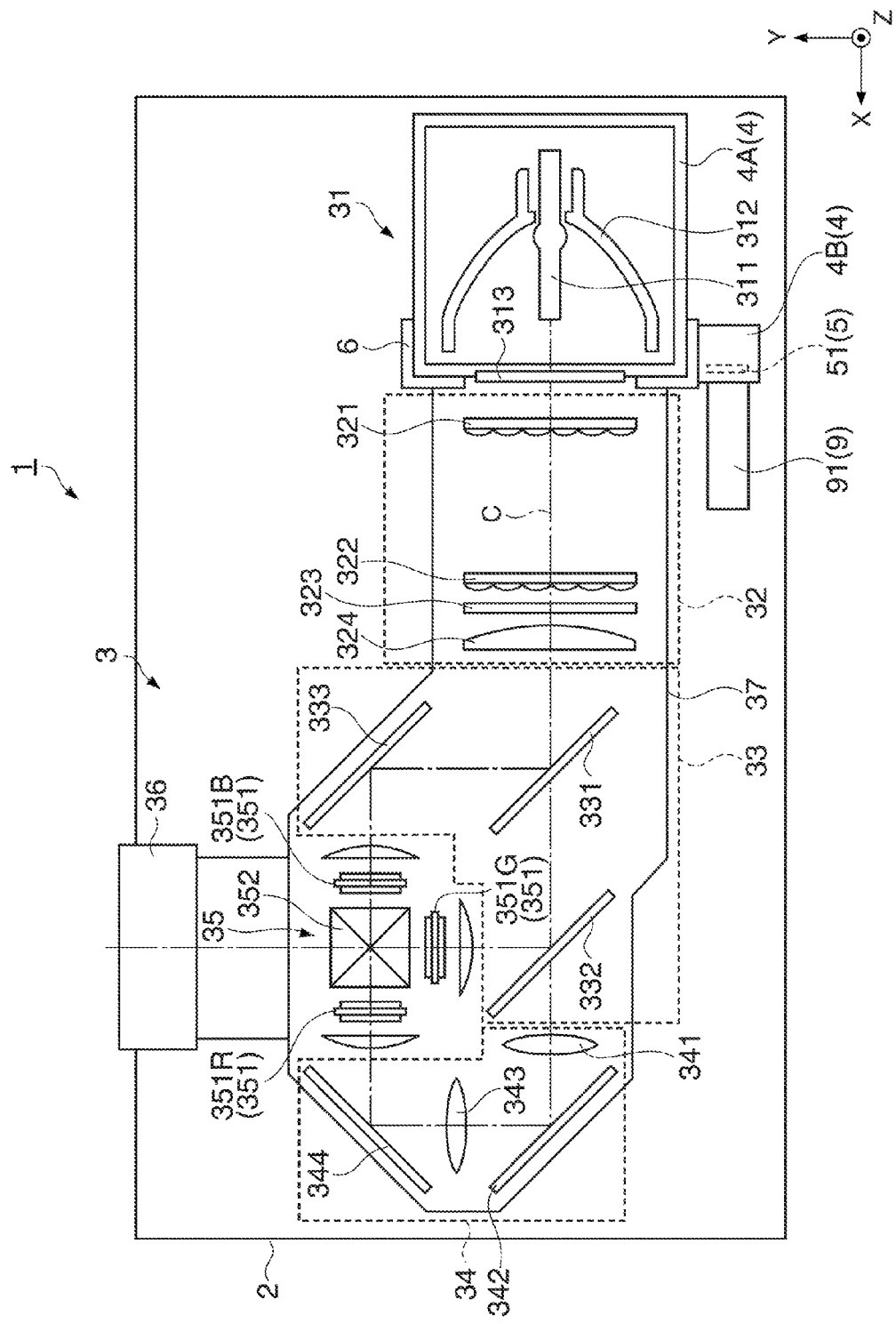
FIG. 1 schematically illustrates the general structure of a projector according to this embodiment.

FIG. 1 schematically illustrates the structure of a projector 1 according to this embodiment.

As illustrated in FIG. 1, the projector 1 includes an external housing 2 constituting the external case of the projector 1, a control unit (not shown), an optical unit 3 containing a light source device 31, and a cooling device 9. A power source device and other associated components, which are not shown, for supplying power to the light source device 31 and the control unit are further provided within the external housing 2.

The external housing 2, the details of which are not described herein, includes an upper case forming the upper part of the external housing 2, and a lower case forming the lower part of the external housing 2, and other components, all of which are fixed via screws or the like. The external housing 2 also has an air inlet port through which the outside air is introduced, an air outlet port through which the air heated within the external housing 2 is discharged to the outside, and others. A not-shown dust filter is further provided at the air inlet port to prevent entrance of dust mixed with the outside air into the external housing 2.

The control unit includes a CPU (central processing unit), a ROM (read only memory), a RAM (random access memory), and others to function as a computer, and controls operations of the projector 1 such as operation associated with image projection, and driving of a cooling fan 91 and others provided on the cooling device 9.

The optical unit 3 performs optical processing for light emitted from the light source device 31 and projects the processed light under the control of the control unit.

As illustrated in FIG. 1, the optical unit 3 includes a collimating lens 313, an integrator illumination system 32, a color separation system 33, a relay system 34, an electro-optical device 35, a projection lens 36, and an optical component housing 37 which locates these optical components at predetermined positions on the optical path, in addition to the light source device 31.

As can be seen from FIG. 1, the optical unit 3 has a substantially L shape in the plan view. The light source device 31 is disposed at one end of the L shape, while the projection lens 36 is disposed at the other end. In the following description, the direction where light is emitted from the light source device 31 corresponds to a +X direction (left side), the direction where light is projected from the projection lens 36 corresponds to a +Y direction (front side), and the upward direction in the standing position corresponds to a +Z direction (upper side), for the convenience of explanation.

The light source device 31 includes a discharge-type light source 311 constituted by an extra-high pressure mercury lamp, a metal halide lamp or the like, a reflector 312, a light source housing 4, an opening and closing device 5, and other components. The reflector 312 of the light source device 31 reflects light emitted from the light source 311 so that the light can travel toward the collimating lens 313.

The light source housing 4 has a plurality of channels through which cooling air delivered from the cooling fan 91 flows, the details of which will be described below. The opening and closing device 5 is so constructed as to allow the cooling air to flow through any of the plural channels in accordance with the position of the projector 1, so that the light source device 311 can be efficiently cooled in any of various positions of the projector 1.

The collimating lens 313 attached to the light source housing 4 equalizes the direction of the light emitted from the light source device 31 and supplies the equalized light toward the integrator illumination system 32.

The integrator illumination system 32 includes a first lens array 321, a second lens array 322, a polarization converting element 323, and a stacking lens 324.

The first lens array 321 is an optical element which divides the light emitted from the light source device 31 into a plurality of partial lights, and has a plurality of small lenses arranged in matrix within a plane disposed substantially perpendicular to an optical axis C of the light emitted from the light source device 31.

The second lens array 322 has a structure almost similar to the structure of the first lens array 321, and stacks the partial lights received from the first lens array 321 on each surface of liquid crystal light valves 351 (described below) in cooperation with the stacking lens 324.

The polarization converting element 323 has the function of equalizing random lights received from the second lens array 322 into substantially one type of polarized lights processable by the liquid crystal light valves 351.

The color separation system 33 has two dichroic mirrors 331 and 332, and a reflection mirror 333, and separates the light received from the integrator illumination system 32 into three color lights of red light (hereinafter referred to as "R light"), green light (hereinafter referred to as "G light"), and blue light (hereinafter referred to as "B light").

The relay system 34 includes an entrance side lens 341, a relay lens 343, and reflection mirrors 342 and 344, and has the function of guiding the R light divided by the color separation system 33 toward a liquid crystal light valve 351R for R light. While the relay system 34 of the optical unit 3 guides the R light in this embodiment, the optical unit 3 may be so constructed as to guide the B light instead of the R light, for example.

The electro-optical device 35 has the liquid crystal light valves 351 corresponding to light modulation devices, and a cross dichroic prism 352 corresponding to a color combining device. The electro-optical device 35 modulates the respective color lights separated by the color separation system 33 according to image information, and combines the modulated color lights.

The liquid crystal light valves 351 are provided for each of the three color lights with one-to-one correspondence (liquid crystal light valve 351R for R light, liquid crystal light valve 351G for G light, and liquid crystal light valve 351B for B light). Each of the liquid crystal light valves 351 has a transmission-type liquid crystal panel, and an entrance side polarization plate and an exit side polarization plate disposed on one and the other surfaces of the liquid crystal panel, respectively.

Each of the liquid crystal light valves 351 has a rectangular pixel area where not-shown small pixels are disposed in matrix. The light transmittance of each pixel is determined in accordance with image information so as to form a display image within the pixel area. The respective color lights separated by the color separation system 33 are modulated by the liquid crystal light valves 351, and supplied to the cross dichroic prism 352.

The cross dichroic prism 352 has a substantially square shape in the plan view formed by affixing four rectangular prisms. Two dielectric multilayer films are provided on the interfaces between the rectangular prisms affixed to each other. The cross dichroic prism 352 reflects the color lights modulated by the liquid crystal light valves 351R and 351B, and transmits the color light modulated by the liquid crystal light valve 351G by using the dielectric multilayer films, thereby combining the respective color lights.

The projection lens 36 has a plurality of lenses, and enlarges and projects the light combined by the cross dichroic prism 352 onto the screen.

As illustrated in FIG. 1, the cooling device 9 includes the cooling fan 91, and not-shown air intake fan, air discharge fan, and duct.

The cooling fan 91 is constituted by a sirocco fan, and disposed in the vicinity of the light source device 31 as illustrated in FIG. 1 to supply cooling air.

The air intake fan introduces the outside air through the air inlet port formed in the external housing 2 and supplies the outside air to the optical components such as the liquid crystal light valves 351.

The air discharge fan discharges air heated within the external housing 2 to the outside through the air outlet port formed in the external housing 2.

Structure of Light Source Device

The details of the light source device 31 are now explained.

Figure 2:
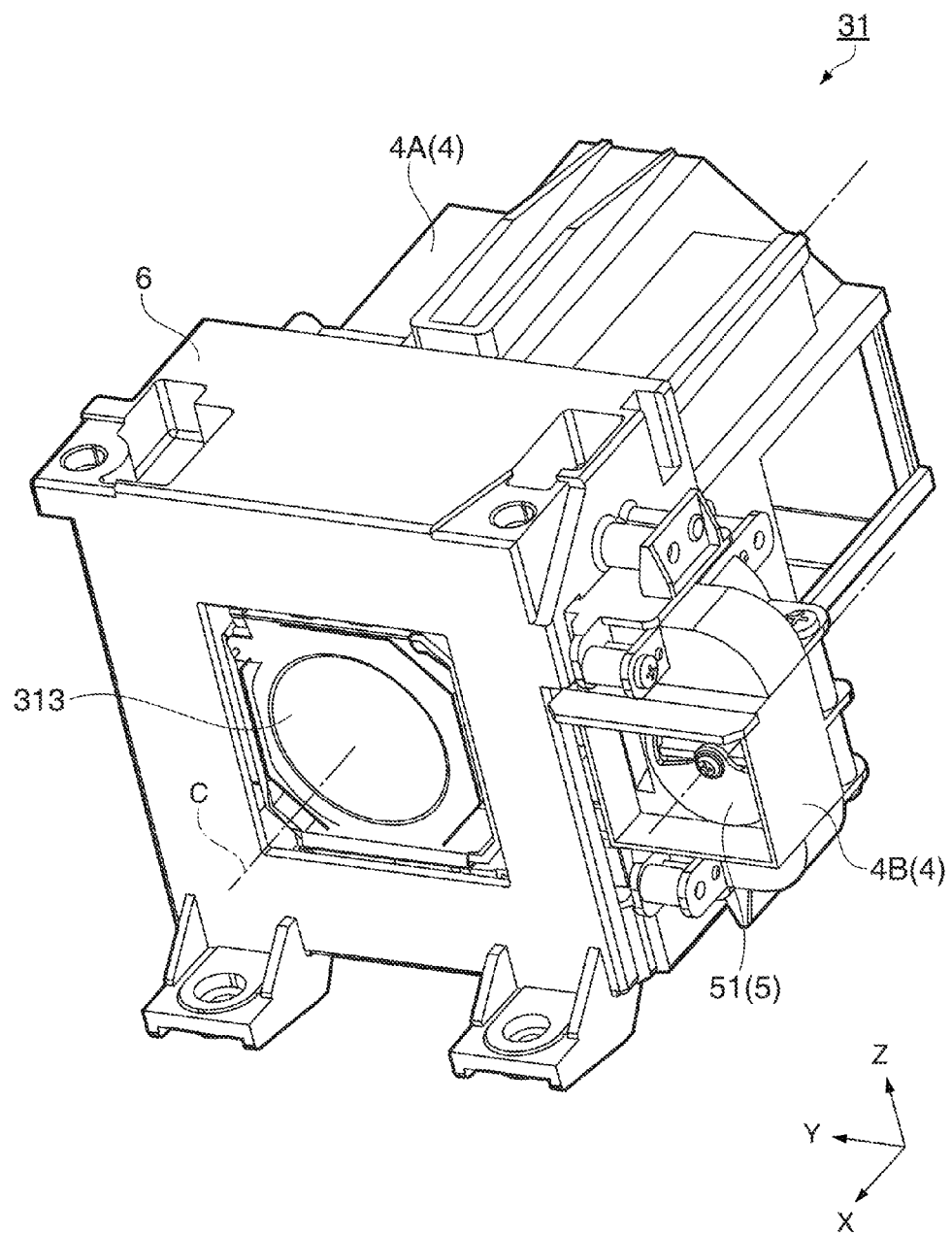
FIG. 2 is a perspective view of a light source device according to this embodiment.
Figure 3:
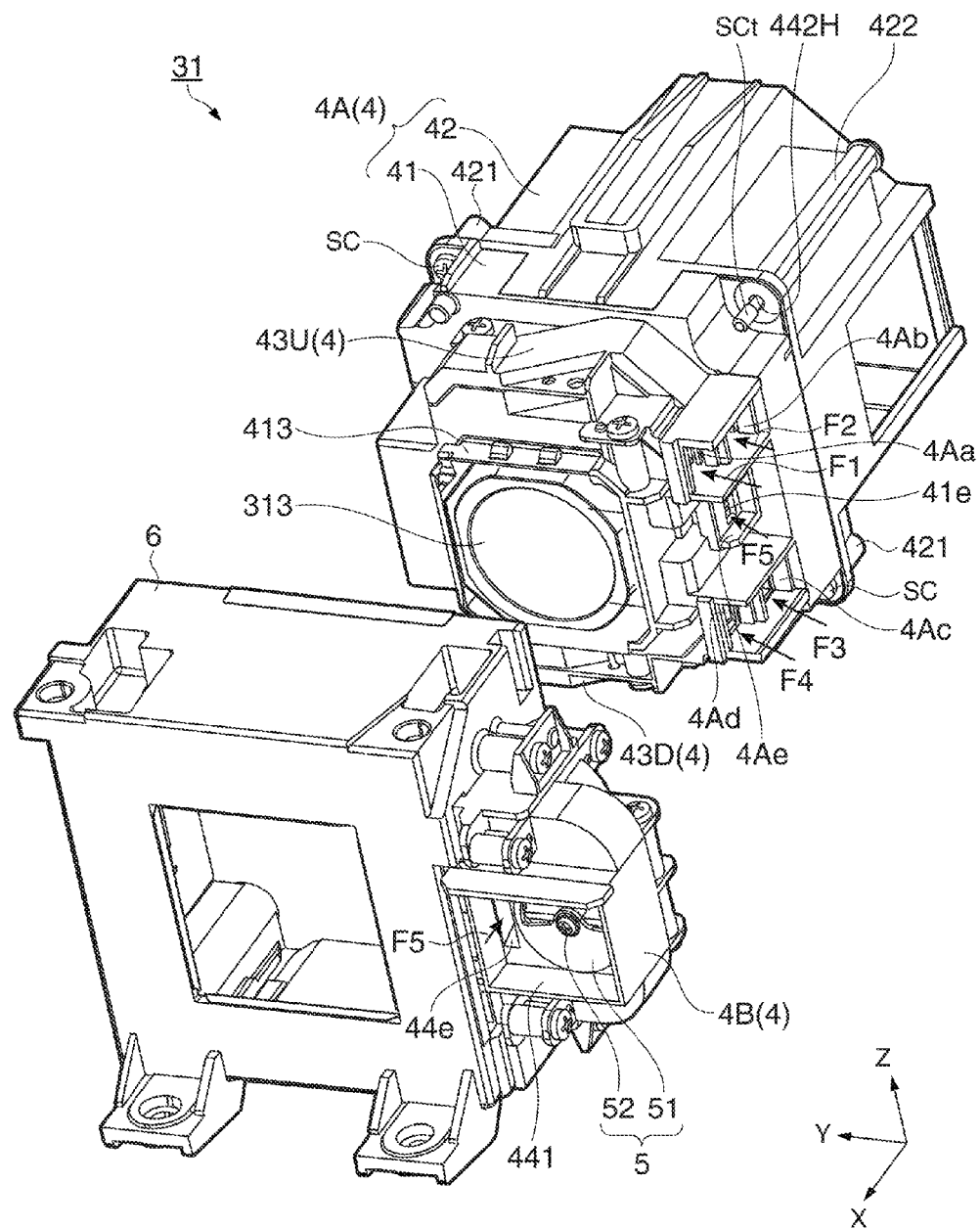
FIG. 3 is a perspective view of the disassembled light source device according to this embodiment.
Figure 4:
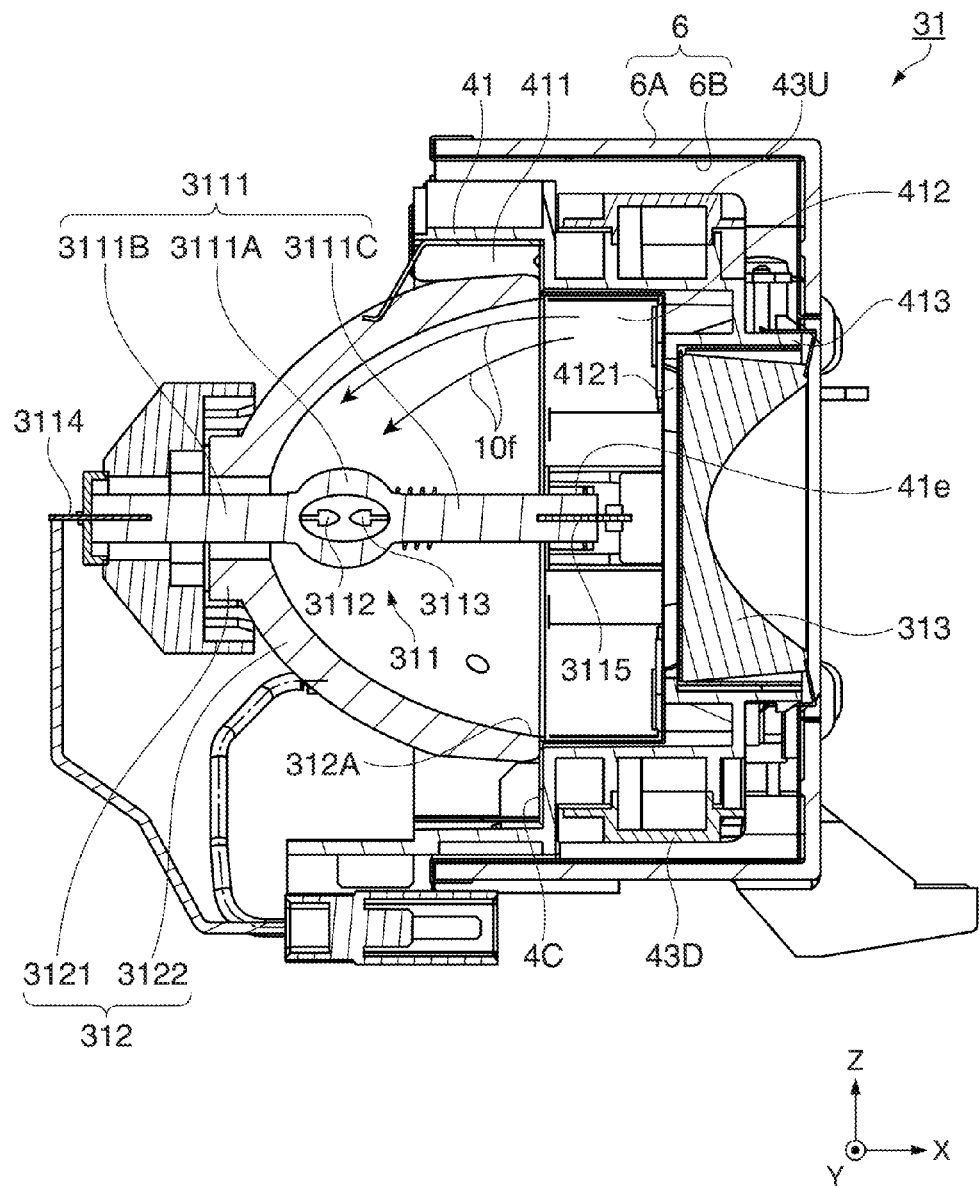
FIG. 4 is a cross-sectional view of the light source device according to this embodiment, not showing a main body cover.

FIG. 2 is a perspective view illustrating the light source device 31. FIG. 3 is a perspective view illustrating the disassembled light source device 31. FIG. 4 is a cross-sectional view of the light source device 31, not showing a main body cover 42 (described below).

As illustrated in FIGS. 2 through 4, the light source device 31 includes the opening and closing device 5 and a holding unit 6 in addition to the light source device 311, the reflector 312, and the light source housing 4.

As illustrated in FIG. 4, the light source 311 has an arc tube 3111, electrodes 3112 and 3113, and leads 3114 and 3115.

The arc tube 3111 is made of heat-resisting glass such as quartz glass, and has a spherical light emission portion 3111A located at the center of the arc tube 3111, and a pair of sealing portions 3111B and 3111C extended from one and the other ends of the light emission portion 3111A, respectively, as illustrated in FIG. 4.

The light emission portion 3111A contains a discharge space into which mercury, rare gas, halogen and others are sealed. The pair of the electrodes 3112 and 3113 are disposed within the discharge space in such a condition that the tips of these electrodes 3112 and 3113 are located close and opposed to each other.

Each of the pair of the sealing portions 3111B and 3111C contains a not-shown metal foil. The pair of the metal foils of the sealing portions 3111B and 3111C are electrically connected with the electrodes 3112 and 3113, respectively, and further connected with the leads 3114 and 3115 extended to the outside of the sealing portions 3111B and 3111C, respectively. When power is supplied to the leads 3114 and 3115, the light source 311 causes discharge between the opposed electrodes 3112 and 3113 and emits light.

The emission of light generates heat, whereby heat convection is produced within the light emission portion 3111A. In this condition, an arc generated between the electrode 3112 and the electrode 3113 is curved upward in the vertical direction, wherefore the center position of the arc is shifted upward from the center between the electrodes.

The electrodes 3112 and 3113 are attached to the reflector 312 with their positions adjusted such that the arc comes to an appropriate position during the adjusting step of manufacture. This arrangement allows efficient emission of light from the light source device 31.

As illustrated in FIG. 4, the reflector 312 has a pipe-shaped neck portion 3121 and a reflection portion 3122 expanded substantially in a concave portion shape in the cross-sectional view from the neck portion 3121.

The neck portion 3121 has an insertion hole through which the one sealing portion 3111B is inserted. The arc tube 3111 is fixed to the reflector 312 by an adhesive injected into the space between the sealing portion 3111B and the insertion hole.

A metal thin film is deposited on the inner surface of the reflection portion 3122 so that the reflection portion 3122 can reflect the light received from the light emission portion 3111A toward an opening 312A on the side opposite to the neck portion 3121.

Structure of Light Source Housing

The light source housing 4 accommodates the light source 311, the reflector 312, and the collimating lens 313, and contains first through fifth channels F1 through F5 (a part of the respective channels is shown in FIG. 3) through which cooling air delivered from the cooling fan 91 is supplied for cooling the light source 311.

As illustrated in FIG. 3, the light source housing 4 includes a reflector housing 4A, an upper cover 43U, a lower cover 43D, an introduction port forming portion 4B, and, as illustrated in FIG. 4, a first sheet metal 4C.

The reflector housing 4A is made of highly heat-resisting synthetic resin, and has a box shape so as to accommodate the light source 311 and the reflector 312. As illustrated in FIG. 3, the reflector housing 4A has an outlet port forming portion 41 constituting the +X side of the reflector housing 4A, and a main body cover 42 constituting the −X side of the reflector housing 4A.

The configuration of the outlet port forming portion 41 on the inner surface side is initially explained.

Figure 5:
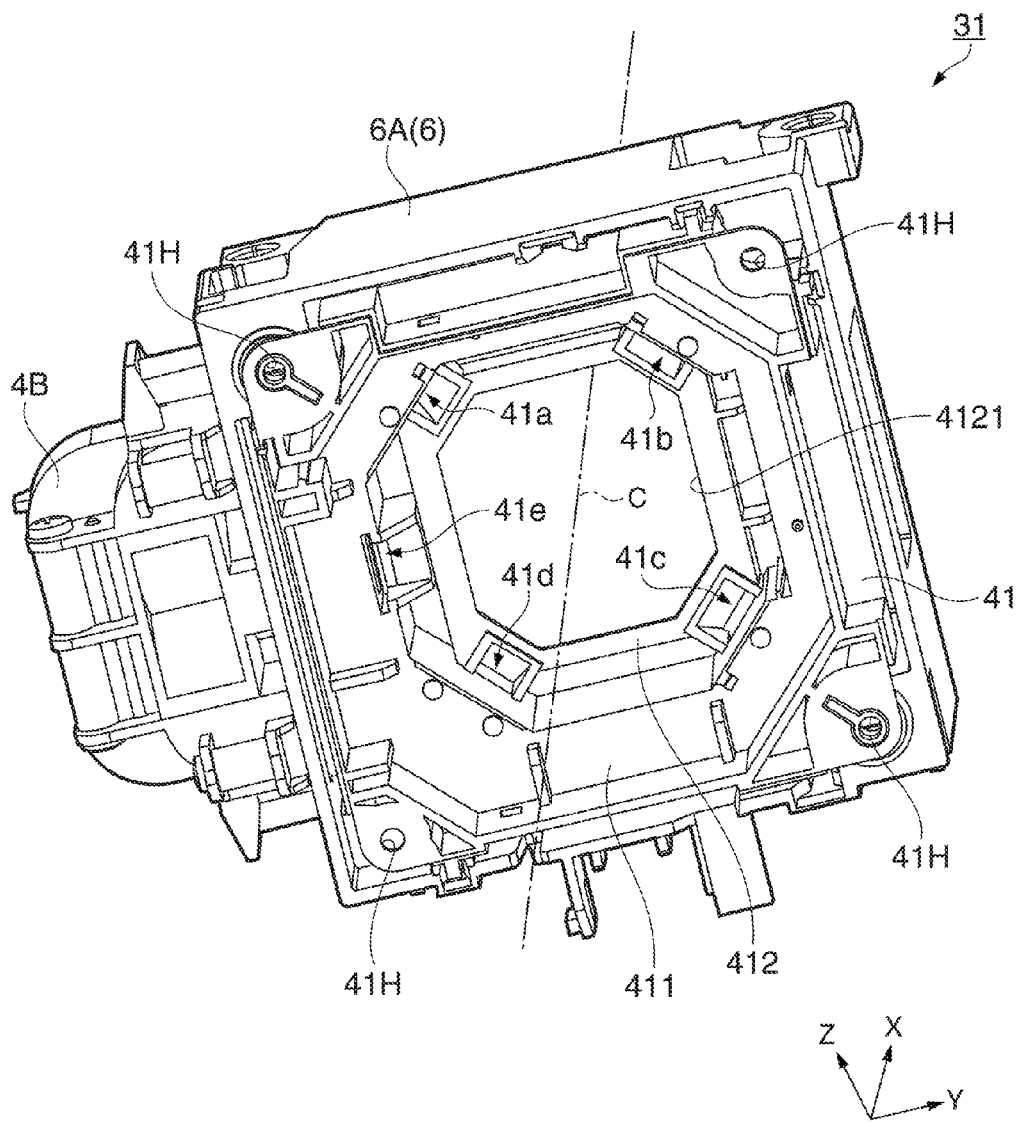
FIG. 5 is a perspective view of an outlet port forming portion, an introduction port forming portion, and a holding unit according to this embodiment as viewed from the inner surface side of the outlet port forming portion.

FIG. 5 is a perspective view illustrating the outlet port forming portion 41, the introduction port forming portion 4B, and the holding unit 6 as viewed from the inner surface side (−X side) of the outlet port forming portion 41.

As illustrated in FIG. 5, the outlet port forming portion 41 has a rectangular shape in the plan view as viewed from the −X side. A flat portion is provided at each of the four corners of the outlet port forming portion 41 on the −X side. Each of the flat portions has an insertion hole 41H through which a screw is inserted.

The outlet port forming portion 41 further has a first concave portion 411 recessed toward the +X side from the flat portions at the four corners, and a second concave portion 412 recessed toward the +X side from the first concave portion 411.

As illustrated in FIG. 4, the first concave portion 411 is so sized as to receive the opening 312A of the reflector 312. The tip of the reflector 312 contacts the bottom surface of the first concave portion 411 via the first sheet metal 4C.

The first sheet metal 4C has the function of reducing deterioration of the outlet port forming portion 41 caused by light reflected on the reflector 312. As illustrated in FIG. 4, the first sheet metal 4C is disposed along the bottom surface of the first concave portion 411 and the inner surface of the second concave portion 412.

As illustrated in FIG. 4, the second concave portion 412 is recessed toward the +X side from the tip of the sealing portion 3111C. An opening 4121 through which the light reflected by the reflector 312 passes is formed at the center of the bottom surface of the second concave portion 412.

As illustrated in FIG. 5, the second concave portion 412 has a substantially octagonal shape in the plan view. More specifically, the second concave portion 412 has an octagonal configuration which has upper and lower walls extending along the X-Y plane, and left and right walls extending along the X-Z plane, with the upper and lower walls and the left and right walls connected with inclined walls as viewed in FIG. 5. Rectangular outlet ports 41a, 41b, 41c, and 41d are formed in the bottom surface of the second concave portion 412 at positions close to the inclined walls.

The respective outlet ports 41a, 41b, 41c, and 41d are provided at the downstream ends of the first through fourth channels F1 through F4 so that cooling airs flowing through the respective channels F1 through F4 can be discharged from the outlet ports 41a through 41d.

The outlet ports 41a, 41b, 41c, and 41d are provided on the upper left, upper right, lower right and lower left sides with respect to the optical axis C as viewed in FIG. 5. The outlet ports 41a, 41b, 41c, and 41d are located on the +X side with respect to the opening 312A of the reflector 312 along the circumference of the opening 312A. In other words, the outlet ports 41a, 41b, 41c, and 41d are disposed in such positions as to surround the arc tube 3111 as viewed in the X direction.

The opening area of the outlet port 41a is made smaller than the opening area of the outlet port 41b. Similarly, the opening area of the outlet port 41d is made smaller than the opening area of the outlet port 41c. The outlet ports 41a, 41b, 41c, and 41d are disposed substantially symmetric in the up-down direction with respect to the X-Y plane passing through the optical axis C.

As illustrated in FIG. 5, an auxiliary outlet port 41e through which cooling air introduced into the fifth channel F5 is discharged is formed in the left side (-Y side) wall of the outlet port forming portion 41 provided between the first concave portion 411 and the second concave portion 412. As illustrated in FIG. 4, the auxiliary outlet port 41e is positioned at the tip of the sealing portion 3111C, that is, in the vicinity of the lead 3115 as viewed in the Y direction.

The configuration of the outlet port forming portion 41 on the outer surface side is now explained.

A frame 413 accommodating the collimating lens 313, and the downstream side of the first through fourth channels F1 through F4 produced by the upper cover 43U and the lower cover 43D are disposed on the outer surface side of the outlet port forming portion 41.

As illustrated in FIGS. 3 and 4, the frame 413 projects in a frame shape from the outer surface side of the second concave portion 412 (see FIG. 5) in such a manner as to cover the outer circumference of the collimating lens 313.

Figure 6A:
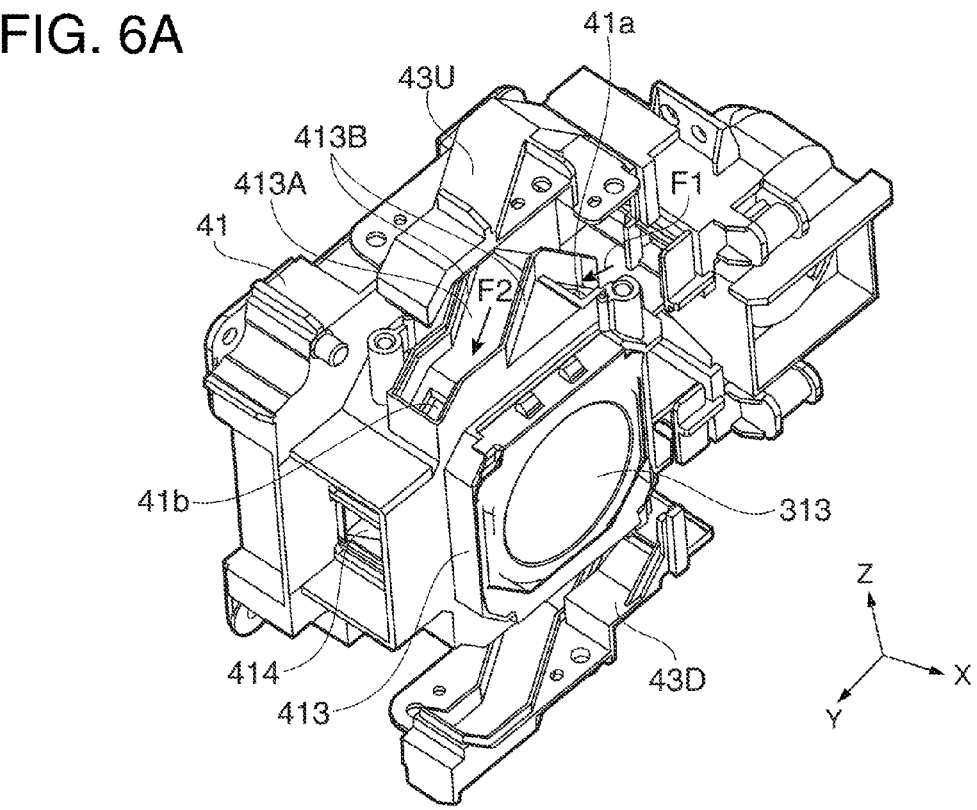
FIGS. 6A and 6B are perspective views of the outlet port forming portion, and an upper cover and a lower cover in a disassembled condition according to this embodiment.
Figure 6B:
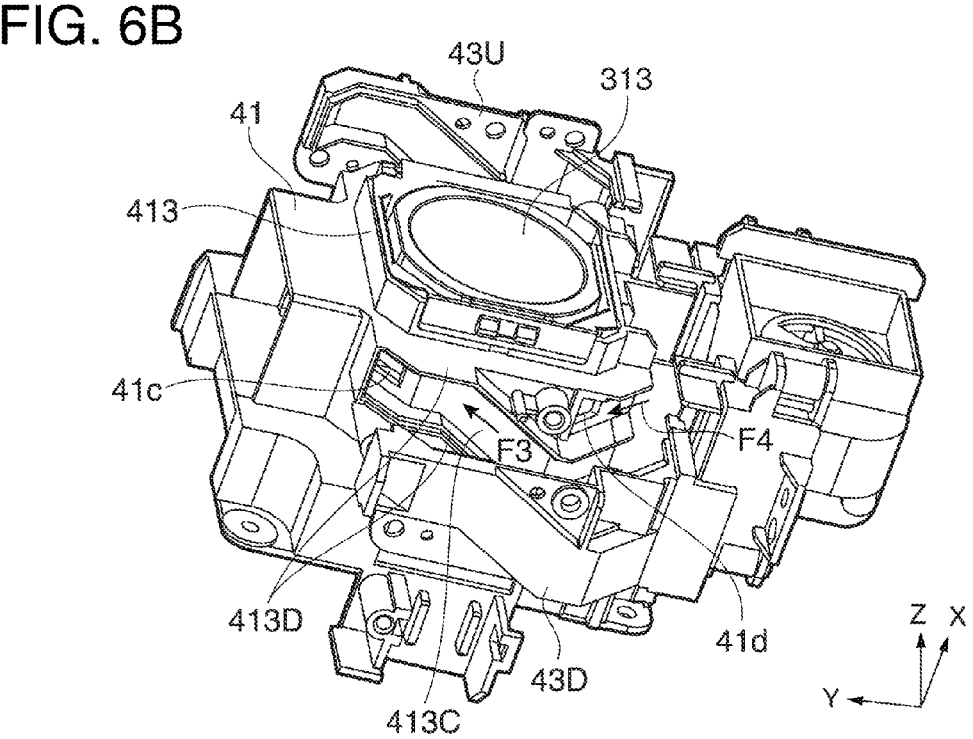

FIGS. 6A and 6B are perspective views illustrating the outlet port forming portion 41, and the upper cover 43U and the lower cover 43D in a disassembled condition. FIG. 6A is a figure as viewed from above, while FIG. 6B is a figure as viewed from below.

As illustrated in FIG. 6A, the downstream side of the first channel F1 and the second channel F2 is formed by an upper surface 413A of the second concave portion 412 (see FIG. 5) on the outer surface side, a plurality of walls 413B rising from the upper surface 413A, and the upper cover 43U extending over the plural walls 413B.

As illustrated in FIG. 3, an inlet port 4Aa through which the upstream side cooling air enters is provided on the downstream side of the first channel F1. The inlet port 4Aa is positioned in the vicinity of the upper end of the outlet port forming portion 41 on the -Y side, and is so formed as to communicate with the outlet port 41a as illustrated in FIG. 6A.

As can be seen from FIG. 3, an inlet port 4Ab through which the upstream side cooling air enters is provided on the downstream side of the second channel F2. The inlet port 4Ab is disposed on the -X side of the inlet port 4Aa such that the inlet ports 4Aa and 4Ab are located side by side, and so formed as to communicate with the outlet port 41b as illustrated in FIG. 6A. The length of the path from the inlet port 4Aa to the outlet port 41a is shorter than the length of the path from the inlet port 4Ab to the outlet port 41b.

As illustrated in FIG. 6B, the downstream side of the third channel F3 and the fourth channel F4 is produced by a lower surface 413C of the second concave portion 412 (see FIG. 5) on the outer surface side, a plurality of walls 413D rising from the lower surface 413C, and the lower cover 43D extending over the plural walls 413D.

As illustrated in FIG. 3, an inlet port 4Ac through which the upstream side cooling air enters is provided on the downstream side of the third channel F3. The inlet port 4Ac is positioned in the vicinity of the lower end of the outlet port forming portion 41 on the -Y side, and is so formed as to communicate with the outlet port 41c as illustrated in FIG. 6B.

As can be seen from FIG. 3, an inlet port 4Ad through which the upstream side cooling air enters is provided on the downstream side of the fourth channel F4. The inlet port 4Ad is disposed on the +X side of the inlet port 4Ac such that the inlet ports 4Ac and 4Ad are located side by side, and so formed as to communicate with the outlet port 41d as illustrated in FIG. 6B. The length of the path from the inlet port 4Ad to the outlet port 41d is shorter than the length of the path from the inlet port 4Ac to the outlet port 41c. As illustrated in FIGS. 3 and 4, the upper cover 43U and the lower cover 43D are so formed as not to project from the outer surface of the first concave portion 411. In other words, the downstream side of the first through fourth channels F1 through F4 is disposed within an area of the projector 1 which often becomes a dead space.

As illustrated in FIG. 3, an inlet port 4Ae communicating with the auxiliary outlet port 41e is provided between the inlet ports 4Aa and 4Ab and the inlet ports 4Ac and 4Ad.

As illustrated in FIG. 6A, a discharge port 414 through which the cooling air having cooled the light source 311 is discharged is formed in the outlet port forming portion 41 on the side opposite to the side of the inlet ports 4Aa, 4Ab, 4Ac, and 4Ad.

As illustrated in FIG. 3, the main body cover 42 has an end having a rectangular shape in the plan view, which is substantially the same configuration as that of the end surface of the outlet port forming portion 41 on the -X side. There are provided a pair of bosses 421 and a pair of pipe-shaped portions 422 (one of the pipe-shaped portions 422 is not shown) on the four corners of the rectangular shape in the plan view. The pair of the bosses 421 are disposed on one diagonal line of the rectangular shape, while the pair of the pipe-shaped portions 422 are disposed on the other diagonal line.

Each of the pair of bosses 421 extends in the X direction, and has a screw hole (not shown) at the position opposed to the insertion hole 41H of the outlet port forming portion 41. The outlet port forming portion 41 accommodating the light source 311 and the reflector 312 is fixed to the main body cover 42 via screws SC inserted into these insertion holes.

Each of the pair of the pipe-shaped portions 422 extends longer than the bosses 421 in the X direction to reach a position near the end of the main body cover 42 on the -X side. Each of the pipe-shaped portions 422 has an insertion hole 422H at the position opposed to the insertion hole 41H of the outlet port forming portion 41. As illustrated in FIG. 3, an attachment/detachment screw SCt is inserted into each of the insertion holes 422H. Each of the attachment/detachment screws SCt has a retaining ring so as to avoid separation from the main body cover 42.

After the upper cover 43U and the lower cover 43D are attached to the reflector housing 4A accommodating the light source 311 and the reflector 312, the reflector housing 4A is fixed to the holding unit 6 via the attachment/detachment screws SCt. Thus, the reflector housing 4A is fixed to the holding unit 6 in such a manner as to be freely attachable to and detachable from the holding unit 6 in the X direction.

The introduction port forming portion 4B is now discussed.

The introduction port forming portion 4B is an area where the upstream side of the first through fifth channels F1 through F5 is disposed. As illustrated in FIG. 3, the introduction port forming portion 4B accommodates the opening and closing device 5, and is fixed to a holding frame 6A on the -Y side. Therefore, when the reflector housing 4A and the introduction port forming portion 4B are combined by junction between the holding unit 6 and the reflector housing 4A to which the upper cover 43U and the lower cover 43D are attached, connection can be produced from the upstream side of the first through fifth channels F1 through F5 to the downstream side thereof.

Figure 7:
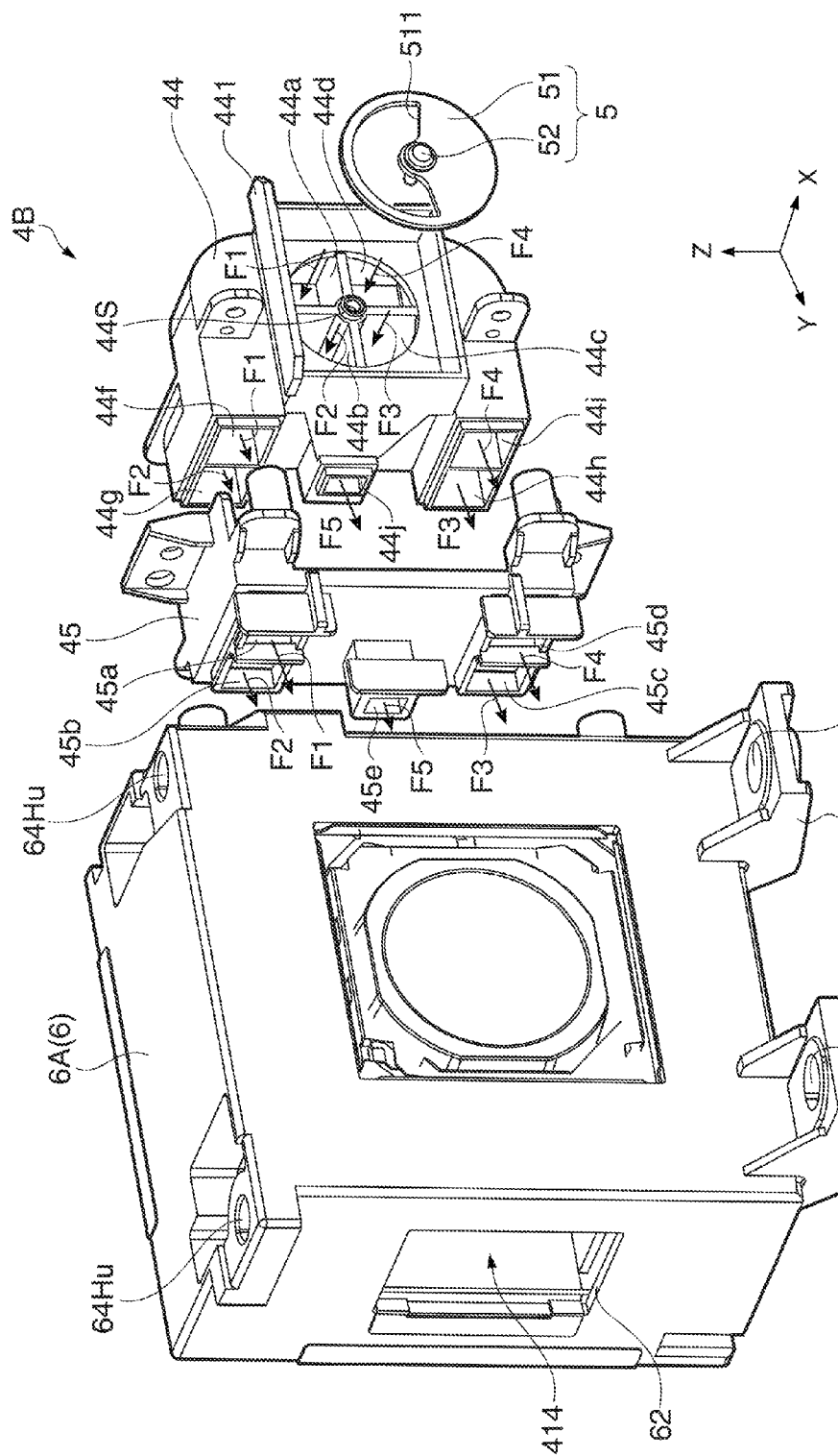
FIG. 7 is a perspective view of the introduction port forming portion and an opening and closing device in a disassembled condition according to this embodiment.

FIG. 7 is a perspective view illustrating the introduction port forming portion 4B and the opening and closing device 5 in a disassembled condition.

As can be seen from FIG. 7, the introduction port forming portion 4B is disposed on the −Y side of the holding unit 6, and has a first forming portion 44 and a second forming portion 45.

The first forming portion 44 has a box shape, and includes introduction ports 44a, 44b, 44c, and 44d and an auxiliary introduction port 44e through which cooling airs delivered from the cooling fan 91 are introduced, and first discharge ports 44f, 44g, 44h, 44i, and 44j communicating with the introduction ports 44a, 44b, 44c, and 44d, and the auxiliary introduction port 44e, respectively.

As illustrated in FIG. 7, the introduction ports 44a, 44b, 44c, and 44d are disposed at the center of the first forming portion 44 at the +X side end thereof, and arranged around a center shaft 44S extending in the X direction. More specifically, the introduction ports 44a, 44b, 44c, and 44d are constituted by substantially four equal parts of an opening which is circular in the plan view with its center located on the center shaft 44S, and divided along a wall passing through the center shaft 44S and extending along the X-Y plane and a wall passing through the center shaft 44S and extending along the X-Z plane. In other words, the introduction ports 44a, 44b, 44c, and 44d are formed by dividing the opening which is circular in the plan view, along the walls extending radially from the center shaft 44S. The center shaft 44S has a screw hole.

More specifically, the introduction ports 44a, 44b, 44c, and 44d are provided on the upper right side, upper left side, lower left side, and lower right side with respect to the center shaft 44S as viewed in FIG. 7 (from the +X side), constituting the upstream side ends of the first through fourth channels F1 through F4. As noted above, the outlet ports 41a, 41b, 41c, and 41d are provided on the upper left side, upper right side, lower right side, and lower left side with respect to the optical axis C as viewed in FIG. 5 (from the −X side). Thus, the introduction ports 44a, 44b, 44c, and 44d are disposed with respect to the center shaft 44S in the manner similar to the positions of the outlet ports 41a, 41b, 41c, and 41d with respect to the optical axis C.

A rectangular frame 441 is equipped on the first forming portion 44 in such a position as to surround the introduction ports 44a, 44b, 44c, and 44d.

As illustrated in FIG. 3, the auxiliary introduction port 44e is located between the wall of the frame 441 on the +Y side and the introduction ports 44a, 44b, 44c, and 44d to form the upstream side end of the fifth channel F5.

The tip of the delivery port of the cooling fan 91 through which cooling fan is delivered is inserted into the frame 441 so that the delivered cooling air can be introduced into the introduction ports 44a, 44b, 44c, and 44d and the auxiliary introduction port 44e.

As illustrated in FIG. 7, the first discharge ports 44f, 44g, 44h, 44i, and 44j are provided at the +Y side end of the first forming portion 44. More specifically, the first discharge ports 44f and 44g are arranged side by side in the vicinity of the upper end of the first forming portion 44 such that the first discharge port 44f is positioned on the +X side of the first discharge port 44g. On the other hand, the first discharge ports 44h and 44i are arranged side by side in the vicinity of the lower end of the first forming portion 44 such that the first discharge port 44i is positioned on the +X side of the first discharge port 44h. The first discharge port 44j is positioned between the first discharge ports 44f and 44g and the first discharge ports 44h and 44i.

The second forming portion 45 is a component assembled to the +Y side of the first forming portion 44. As illustrated in FIG. 7, the second forming portion 45 has second discharge ports 45a, 45b, 45c, 45d, and 45e communicating with the first discharge ports 44f, 44g, 44h, 44i, and 44j, respectively.

The peripheries of the second discharge ports 45a, 45b, 45c, 45d, and 45e engage in a preferable condition with the peripheries of the inlet ports 4Aa, 4Ab, 4Ac, 4Ad, and 4Ae (see FIG. 3) formed in the outlet port forming portion 41 at the time of attachment of the reflector housing 4A to the holding unit 6, so that the cooling airs coming from the first forming portion 44 can enter the inlet ports 4Aa, 4Ab, 4Ac, 4Ad, and 4Ae with high efficiency.

The reflector housing 4A attached to the holding unit 6 is combined with the introduction port forming portion 4B fixed to the holding unit 6. In this condition, the outlet ports 41a, 41b, 41c, and 41d communicate with the introduction ports 44a, 44b, 44c, and 44d, respectively. Thus, when the reflector housing 4A is joined with the introduction port forming portion 4B, the upstream side of the first through fifth channels F1 through F5 is connected with the downstream side thereof. The length of the path from the introduction port 44a to the outlet port 41a is shorter than the length of the path from the introduction port 44b to the outlet port 41b. Similarly, the length of the path from the introduction port 44d to the outlet port 41d is shorter than the length of the path from the introduction port 44c to the outlet port 41c. At the time of replacement of the light source 311, the reflector housing 4A is separated from the introduction port forming portion 4B and removed from the holding unit 6.

Structure of Opening and Closing Device

The opening and closing device 5 has a rotating member 51 which rotates to selectively open and close the introduction ports 44a, 44b, 44c, and 44d in accordance with the position of the projector 1.

As illustrated in FIG. 7, the opening and closing device 5 has a regulating screw 52 together with the rotating member 51.

The rotating member 51 is constituted by a circular sheet metal whose external shape in the plan view is larger than the external shape of the introduction ports 44a, 44b, 44c, and 44d. An insertion hole (not shown) into which the center shaft 44S of the first forming portion 44 is inserted is formed at the center of the rotating member 51. The rotating member 51 has an opening 511 which opens in an area other than the circumference of the rotating member 51 and substantially the half of the circular shape thereof to open any of the introduction ports 44a, 44b, 44c, and 44d.

The rotating member 51 is rotatably supported around the center shaft 44S inserted through the insertion hole of the rotating member 51. That is, the rotating member 51 extends in the same direction as the direction of the optical axis C, and is rotatable around the center shaft 44S disposed outside the reflector 312. The weight of the rotating member 51 on the opening 511 side with respect to the center shaft 44S is smaller than the weight of the opposite side. Thus, the rotating member 51 rotates by gravity in such a manner that the opening 511 side comes to the upper side in the vertical direction.

The regulating screw 52 is screwed into the screw hole of the center shaft 44S on which the rotating member 51 is supported so as to prevent separation of the rotating member 51 from the center shaft 44S.

Structure of Holding Unit

As illustrated in FIG. 3, the introduction port forming portion 4B accommodating the opening and closing device 5 is attached to the holding unit 6, in which condition the reflector housing 4A is supported by the holding unit 6 in such a manner as to be feely attachable to and detachable from the holding unit 6.

The holding unit 6 has the holding frame 6A and a second sheet metal 6B.

Figure 8:
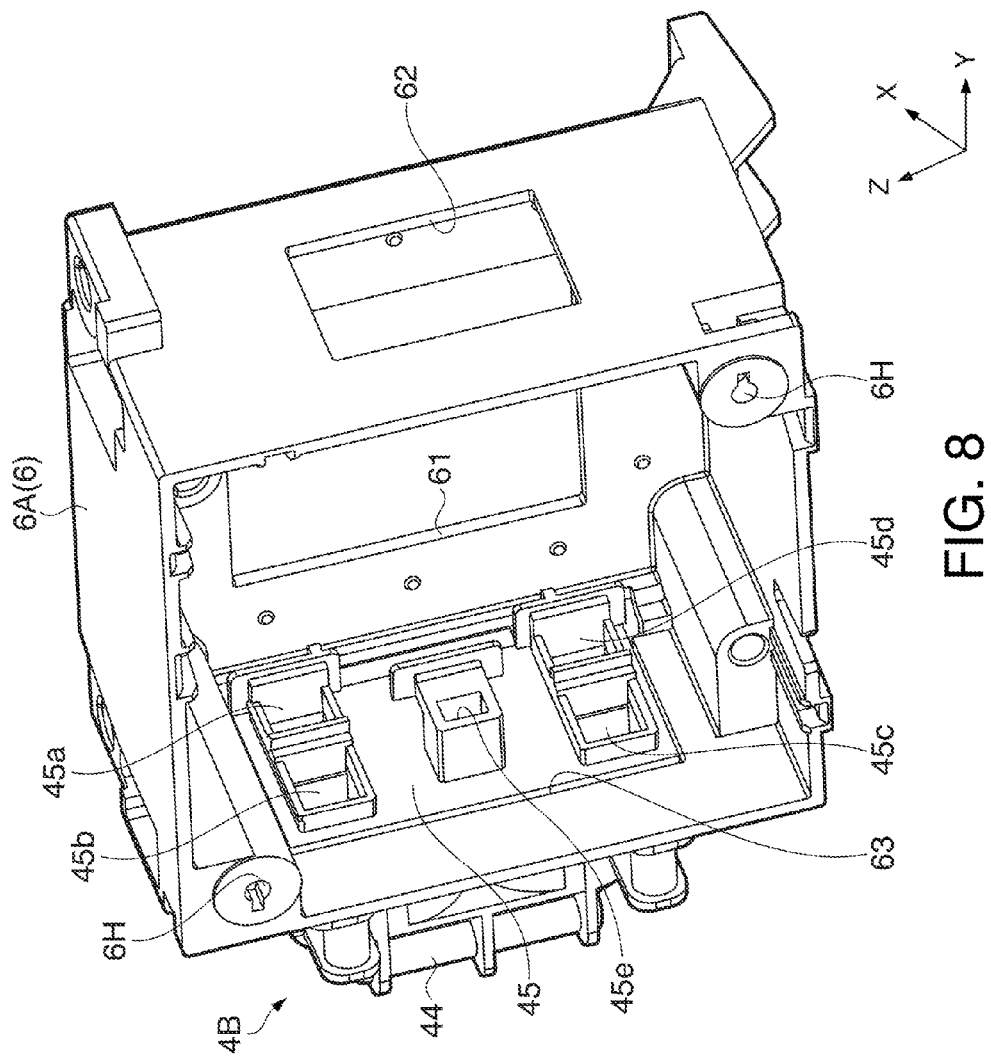
FIG. 8 is a perspective view of the holding unit to which the introduction port forming portion according to this embodiment is attached.

FIG. 8 is a perspective view illustrating the holding unit 6 to which the introduction port forming portion 4B is attached, not showing the second sheet metal 6B.

The holding frame 6A is made of highly heat-resisting synthetic resin, and has a shape which is rectangular in the plan view and has an opening on the −X side as illustrated in FIG. 8. Moreover, the holding frame 6A has a configuration receiving the tip of the outlet port forming portion 41 as illustrated in FIG. 5.

As illustrated in FIG. 8, an opening 61 through which light passes is formed in the +X side surface of the holding frame 6A. On the other hand, a discharge port 62 communicating with the discharge port 414 (see FIG. 6A) of the outlet port forming portion 41 is formed in the +Y side surface of the holding frame 6A. Furthermore, an opening 63 through which the second discharge ports 45a, 45b, 45c, 45d, and 45e of the introduction port forming portion 4B are exposed is formed in the −Y side surface of the holding frame 6A.

Among the four corners of the holding frame 6A, each of the corners positioned on one diagonal line has a screw hole 6H into which the attachment/detachment screw SCt (see FIG. 3) projecting from the insertion hole 422H of the main body cover 42 is screwed. As illustrated in FIG. 7, a pair of projections 64 project in the +X direction from the lower end of the holding frame 6A. An insertion hole 64Hd through which a screw is inserted is formed in each of the projections 64. Moreover, a pair of round holes 64Hu are formed in the upper surface of the holding frame 6A.

The second sheet metal 6B has the function of reducing deterioration of the holding frame 6A caused by light reflected by the reflector 312. As illustrated in FIG. 4, the second sheet metal 6B is disposed along the inner surface of the holding frame 6A.

The holding unit 6 is fixed to the lower case of the external housing 2 via the screws inserted through the insertion holes 64Hd. When the upper case of the external housing 2 is assembled to the lower case thereof, projections (not shown) provided on the upper case are inserted into the round holes 64Hu to fix the holding unit 6 to the external housing 2.

After the upper cover 43U and the lower cover 43D are attached to the reflector housing 4A accommodating the light source 311 and the reflector 312, the introduction port forming portion 4B is joined to the reflector housing 4A, in which condition the reflector housing 4A is detachably attached to the holding unit 6 fixed to the external housing 2.

Operation of Opening and Closing Device and Flow of Cooling Air

The operation of the opening and closing device 5, and the flow of cooling air delivered from the cooling fan 91 are now explained with reference to FIGS. 9A through 11B.

Figures 9A, 9B:
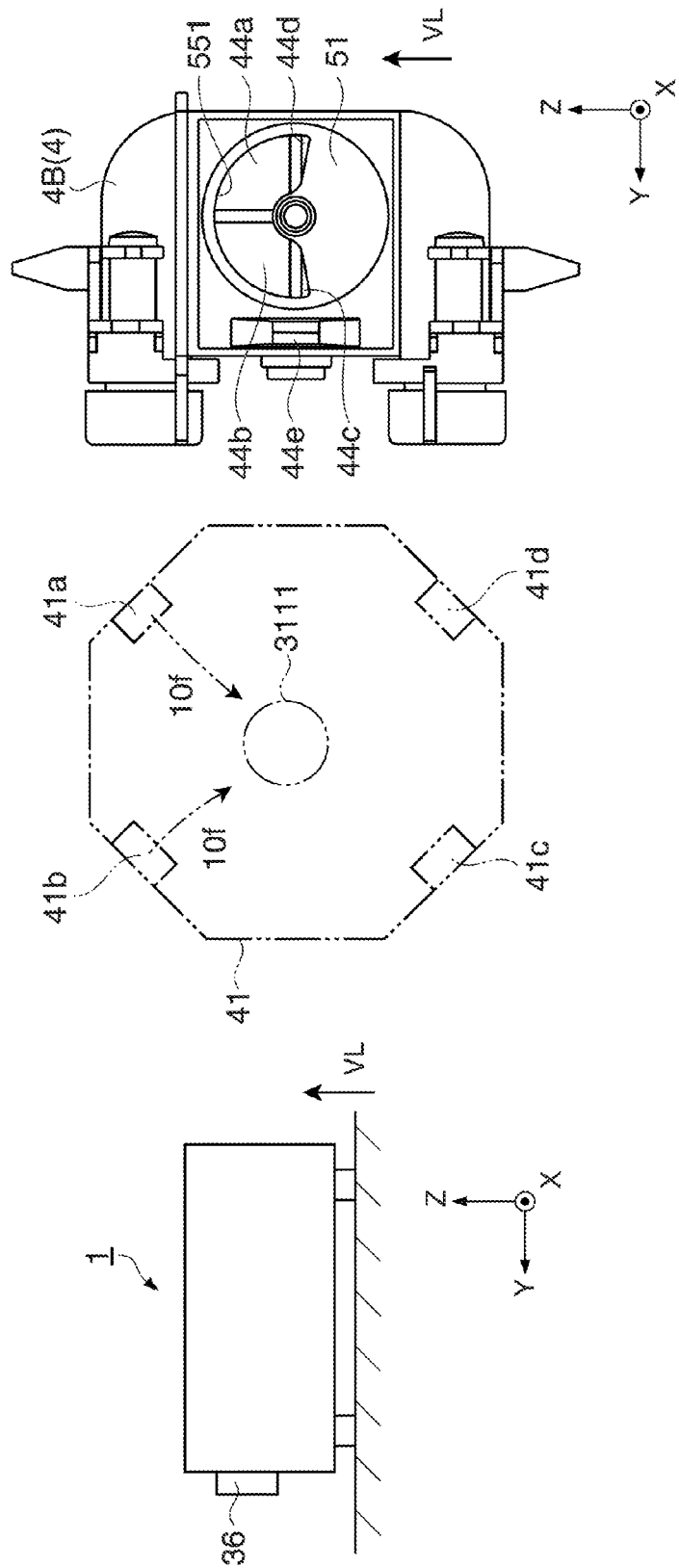
FIGS. 9A and 9B illustrate operation and flow of cooling air according to this embodiment.

FIG. 9A schematically illustrates the projector 1 installed in the standing position. FIG. 9B is a plan view showing the introduction port forming portion 4B, the opening and closing device 5, and the outlet ports 41a, 41b, 41c, and 41d of the projector 1 placed in the standing position. FIG. 9A is a figure shown at a lower magnification than that of FIG. 9B. FIG. 9B schematically illustrates the outlet ports 41a, 41b, 41c, and 41d.

As illustrated in FIG. 9A, the projector 1 is placed such that the +Z side of the projector 1 is located on the upper side in a vertical direction VL when installed in the standing position. In this condition, the introduction ports 44a and 44b are positioned above the introduction ports 44c and 44d as illustrated in FIG. 9B. Moreover, the outlet ports 41a and 41b are positioned above the arc tube 3111, while the outlet ports 41c and 41d are positioned below the arc tube 3111.

The opening 511 of the rotating member 51 is located on the upper side in the vertical direction VL by the force of gravity. In this condition, the introduction ports 44a and 44b are opened, while the introduction ports 44c and 44d are substantially closed. Accordingly, the cooling air delivered from the cooling fan 91 is supplied to the introduction ports 44a and 44b, but substantially no cooling air is delivered to the introduction ports 44c and 44d.

The cooling airs supplied to the introduction ports 44a and 44b flow through the first channel F1 and the second channel F2, and go out through the outlet ports 41a and 41b as illustrated in FIG. 9B. Then, cooling airs 10f coming from the outlet ports 41a and 41b become the cooling air 10f directly supplied to the arc tube 3111, or the cooling air 10f flowing along the inner surface of the reflector 312 and reaching the arc tube 3111 as illustrated in FIGS. 4 and 9B. Thus, the arc tube 3111 is cooled by the cooling airs 10f supplied from above in the vertical direction VL.

The length of the path from the introduction port 44a to the outlet port 41a is shorter than the length of the path from the introduction port 44b to the outlet port 41b. Moreover, the opening area of the outlet port 41a is smaller than the opening area of the outlet port 41b. Thus, the volumes of the cooling airs flowing out of the outlet ports 41a and 41b are equalized. The cooling air having cooled the arc tube 3111 flows through the discharge ports 414 and 62 to the outside of the light source device 31, and is discharged to the outside of the projector 1 by the operation of the air discharge fan (not shown).

FIG. 10A schematically illustrates the projector 1 in the hanging position. FIG. 10B is a plan view of the introduction port forming portion 4B, the opening and closing device 5, and the outlet ports 41a, 41b, 41c, and 41d of the projector 1 installed in the hanging position. Similarly to FIGS. 9A and 9B, FIG. 10A is a figure shown at a lower magnification than that of FIG. 10B, and FIG. 10B schematically illustrates the outlet ports 41a, 41b, 41c, and 41d.

As illustrated in FIG. 10A, the projector 1 is placed such that the +Z side of the projector 1 is located on the lower side in the vertical direction VL when installed in the hanging position. In this condition, the introduction ports 44c and 44d are positioned above the introduction ports 44a and 44b as illustrated in FIG. 10B. Moreover, the outlet ports 41c and 41d are positioned above the arc tube 3111, while the outlet ports 41a and 41b are positioned below the arc tube 3111.

The introduction ports 44c and 44d of the introduction ports 44a, 44b, 44c, and 44d are opened, while the introduction ports 44a and 44b are substantially closed by the rotating member 51 rotated by gravity. Accordingly, the cooling air delivered from the cooling fan 91 is supplied to the introduction ports 44c and 44d, but substantially no cooling air is delivered to the introduction ports 44a and 44b.

The cooling airs supplied to the introduction ports 44c and 44d flow through the third channel F3 and the fourth channel F4, and go out through the outlet ports 41c and 41d to reach the arc tube 3111 as illustrated in FIG. 10B. Thus, the arc tube 3111 is similarly cooled by cooling airs 11f supplied from above in the vertical direction VL even in the hanging position.

The length of the path from the introduction port 44d to the outlet port 41d is shorter than the length of the path from the introduction port 44c to the outlet port 41c. Moreover, the opening area of the outlet port 41d is smaller than the opening area of the outlet port 41c. Thus, the volumes of the cooling airs coming from the outlet ports 41c and 41d are equalized.

FIG. 11A schematically illustrates an example of an inclined position where the projector 1 is located inclined to the position of the projector 1 placed in the standing position. FIG. 11B is a plan view showing the introduction port forming portion 4B, the opening and closing device 5, and the outlet ports 41a, 41b, 41c, and 41d of the projector 1 placed in the inclined position. Similarly to FIGS. 9A and 9B, FIG. 11A is a figure shown at a lower magnification than that of FIG. 11B. FIG. 11B schematically shows the outlet ports 41a, 41b, 41c, and 41d.

As illustrated in FIG. 11A, the +Z side of the projector 1 is inclined to the vertical direction VL substantially at 45 degrees toward the left when the projector is positioned inclined to the standing position (with substantially 45° inclination) such that the projection lens 36 is located on the lower side. In this condition, the introduction port 44a is located above the introduction port 44c, while the introduction ports 44b and 44d are located substantially along the horizontal direction as illustrated in FIG. 11B. The outlet port 41a is positioned above the arc tube 3111, while the outlet port 41c is positioned below the arc tube 3111. The outlet ports 41b and 41d are positioned on the side of the arc tube 3111.

Under this condition, the rotating member 51 rotated by gravity opens the introduction port 44a, closes the introduction port 44c, and opens substantially the halves of the introduction ports 44b and 44d as illustrated in FIG. 11B. As a result, cooling air delivered from the cooling fan 91 is supplied to the introduction ports 44a, 44b, and 44d, but substantially no cooling air is supplied to the introduction port 44c.

The cooling airs supplied to the introduction ports 44a, 44b, and 44d pass through the first channel F1, the second channel F2, and the fourth channel F4, go out through the outlet ports 41a, 41b and 41d, and reach the arc tube 3111 as illustrated in FIG. 11B. Since substantially the halves of the introduction ports 44b and 44d are opened, each volume of cooling airs 12f coming from the outlet ports 41b and 41d is smaller than the volume of cooling air 13f coming from the outlet port 41a. In this condition, the arc tube 3111 in the inclined position is cooled by the cooling air 13f supplied from above, and the cooling airs 12f supplied from the side.

Even when the projector 1 is installed in positions other than the position inclined substantially at 45 degrees as shown in FIG. 11A, the rotating member 51 rotates in accordance with the position of the projector 1 in such a manner as to open the introduction port communicating with any of the outlet ports 41a, 41b, 41c, and 41d located on the upper side with respect to the vertical direction VL, and to close the introduction port communicating with any of the outlet ports 41a, 41b, 41c, and 41d and located on the lower side. In this case, the light source 311 is chiefly cooled by the cooling air supplied from above. Thus, the light source 311 is chiefly cooled by cooling air supplied from above in the vertical direction VL in the range of rotation of the projector 1 through 360 degrees around the shaft extending along the optical axis C.

The auxiliary introduction port 44e is not closed in any positions of the projector 1. As a consequence, a part of the cooling air delivered from the cooling fan 91 passes through the fifth channel F5, and goes out through the auxiliary outlet port 41e to cool the tip side of the arc tube 3111.

According to the light source device 31 thus constructed, the opening and closing device 5 selectively opens and closes the introduction ports 44a, 44b, 44c, and 44d in accordance with the installation position of the projector 1. The light source 311 is cooled by cooling air supplied from above in the vertical direction VL, and cooling air coming from the plural outlet ports disposed adjacent to each other.

According to the projector 1 in this embodiment discussed herein, the following advantages can be offered.

(1) The light source device 31 includes the light source housing 4 and the opening and closing device 5. This structure allows cooling air to reach the light source 311 substantially in the same direction with respect to the vertical direction VL, and thus can cool the light source 311 in a stable condition even when the position of the projector 1 is changed.

(2) The light source device 31 is so constructed as to cool the light source 311 from above in the vertical direction VL regardless of the position of the projector 1. This structure can intensively supply cooling air toward the upper part of the light source 311 in the vertical direction VL corresponding to the easily heated area, thereby achieving efficient cooling for the light source 311.

(3) The rotating member 51 is so designed as to be rotatable by gravity. In this case, the introduction ports 44a, 44b, 44c, and 44d can be selectively opened and closed by a simple structure without requiring components such as a driving unit for driving the rotating member 51 and a controller for controlling the driving unit.

(4) The outlet port forming portion 41 has the four outlet ports 41a, 41b, 41c, and 41d so arranged as to surround the arc tube 3111 as viewed in the direction of the optical axis C. This structure can supply cooling air to the light source 311 substantially in the same direction with respect to the vertical direction VL, and cool the light source 311 in a stable condition even when the position of the projector 1 is changed.

Moreover, the downstream side of the first through fourth channels F1 through F4 is disposed in an area which often becomes a dead space within the projector 1. Thus, the size of the projector 1 does not increase.

(5) The projector 1 includes the light source device 31 discussed herein. In this case, the light source 311 can be efficiently cooled in any position within the range of rotation through 360 degrees around the shaft extending along the optical axis C including the standing position and the hanging position. Accordingly, this structure realizes development of the projector 1 which can widen the range of places and occasions where the projector 1 is used, and allow the use of the light source device 31 for a long period.

(6) The reflector housing 4A can be detached for replacement of the light source 311 under the condition in which the introduction port forming portion 4B and the opening and closing device 5 are assembled to the main body of the projector 1. In this case, the introduction port forming portion 4B and the opening and closing device 5 need not be included in the replacement components required for the replacement of the light source 311. Thus, the number of components required for the replacement does not increase. Moreover, the handling easiness improves by size reduction of the unit to be replaced.

This embodiment can be modified in the following manners.

MODIFIED EXAMPLE 1

According to this embodiment, the light source housing 4 has the four introduction ports 44a, 44b, 44c, and 44d as introduction ports to be opened and closed by the opening and closing device 5. However, the number of the introduction ports is not limited to four but may be other numbers.

FIG. 12 schematically illustrates a part of an introduction port forming portion 7 and an outlet port forming portion 8 according to a modified example 1.

As illustrated in FIG. 12, the introduction port forming portion 7 includes six introduction ports 7a through 7f arranged side by side around a center shaft 7S. The introduction ports 7a through 7f are formed by separating an opening which is circular in the plan view along walls radially extending from the center shaft 7S.

More specifically, the introduction port 7a is located above the center shaft 7S (+Z side), while the introduction ports 7b through 7f are arranged clockwise in this order from the introduction port 7a substantially at equal intervals as viewed in FIG. 12.

As illustrated in FIG. 12, the outlet port forming portion 8 includes six outlet ports 8a through 8f. The outlet ports 8a through 8f are disposed in such positions as to surround the arc tube 3111 as viewed in the X direction. The outlet port 8a is located above the arc tube 3111 (+Z side), while the outlet ports 8b through 8f are arranged clockwise in this order from the outlet port 8a as viewed in FIG. 12. The outlet ports 8a through 8f communicate with the introduction ports 7a through 7f, respectively.

FIGS. 13A through 14B illustrate operation according to the modified example 1.

As illustrated in FIG. 13B, the introduction ports 7a, 7b, and 7f are opened, while the introduction ports 7c, 7d, and 7e are substantially closed by the rotating member 51 under the condition of the projector 1 placed in the standing position as illustrated in FIG. 13A. Cooling airs delivered from the cooling fan 91 are introduced through the introduction ports 7a, 7b, and 7f, go out through the outlet ports 8a, 8b, and 8f, and reach the arc tube 3111. The outlet ports 8a, 8b, and 8f are positioned above the arc tube 3111 with respect to the vertical direction VL. Thus, the arc tube 3111 is cooled by cooling airs 20f supplied from above in the vertical direction VL.

When the projector 1 is installed in an inclined position shown in FIG. 14A similar to the inclined position shown in FIG. 11A, the introduction ports 7a, 7b, and 7c are opened as illustrated in FIG. 14B. In this condition, a part of the introduction port 7f is opened, while the introduction ports 7d and 7e are closed by the rotating member 51. Cooling airs delivered from the cooling fan 91 are introduced through the introduction ports 7a, 7b, 7c, and 7f, go out through the outlet ports 8a, 8b, 8c, and 8f, and reach the arc tube 3111. Since a part of the introduction port 7f is opened, the volume of cooling air 21f coming from the outlet port 8f is smaller than each volume of cooling airs 22f coming from the outlet ports 8a and 8b and cooling air 23f coming from the outlet port 8c.

The outlet ports 8a and 8b are positioned above the arc tube 3111 with respect to the vertical direction VL, while the outlet ports 8c and 8f are positioned on the side of the arc tube 3111. Thus, the arc tube 3111 is cooled by the cooling air 22f supplied from above in the vertical direction VL, and the cooling air 23f supplied from the side.

Accordingly, in the case of the light source device 31 which includes the six outlet ports, the light source device 31 selectively opens and closes the introduction ports 7a through 7f in accordance with the installation position of the projector 1 similarly to the embodiment, wherefore the arc tube 3111 can be cooled by cooling air coming from the plural outlet ports disposed adjacent to each other. The arc tube 3111 is chiefly cooled by the cooling air supplied from above with respect to the vertical direction VL.

MODIFIED EXAMPLE 2

The reflector housing 4A and the introduction port forming portion 4B may be formed integrally with each other so that the integrated unit becomes an attachable and detachable component.

MODIFIED EXAMPLE 3

According to this embodiment, the first through fourth channels F1 through F4 have the outlet ports 41a, 41b, 41c, and 41d, respectively, with one-to-one correspondence. However, one channel may include a plurality of outlet ports.

MODIFIED EXAMPLE 4

According to this embodiment, the opening and closing device 5 has the rotating member 51 rotatable by gravity. However, the opening and closing device 5 may have a driving unit for rotating the rotating member so that the rotating member can be rotated by electrical power.

MODIFIED EXAMPLE 5

According to this embodiment, the three light modulation devices are equipped. However, the number of the light modulation devices is not limited to three but may be one, two, four or larger.

Moreover, each of the light modulation devices in this embodiment has the transmission-type liquid crystal panel. However, a reflection-type liquid crystal panel may be employed in place of the transmission-type panel. Alternatively, the light modulation device may have a device containing micromirror arrays, for example.

MODIFIED EXAMPLE 6

The light source 311 is not limited to a discharge-type lamp, but may be constituted by other types of lamps or solid light sources such as light emitting diode.

MODIFIED EXAMPLE 7

According to this embodiment, the rotating member 51 of the opening and closing device 5 has the opening 511 which only opens in the area other than the periphery and substantially the half of the main body circular shape to open any of the introduction ports 44a, 44b, 44c, and 44d. However, the invention is not required to have this structure. The rotating member 51 may have a structure which does not have the periphery and the opening 511. In other words, the rotating member 51 may have a structure which only has a substantially semicircular shape.

What is claimed is:
1. A light source device, comprising:
a light source;
a reflector that reflects light emitted from the light source;
a reflector housing accommodating the light source and the reflector;
a plurality of introduction ports through which cooling air is introduced;

an introduction port forming portion having a plurality of outlet ports communicating with the plurality of introduction ports;

an opening and closing device opening and closing the plurality of introduction ports; and a holding unit having the introduction port forming portion accommodating the opening and closing device;

wherein the light source device is used in a projector having a cooling device, and the holding unit is fixed to an external housing of the projector and supports the reflector housing in such a manner as to be freely attachable and detachable.

2. The light source device according to claim 1, wherein the opening and closing device has a rotating member which rotates to selectively open and close the plurality of introduction ports in accordance with a position of the projector, and the rotating member opens an introduction port which communicates with an outlet port of the plurality of outlet ports positioned on the upper side of the light source device in the vertical direction, and closes an introduction port which communicates with an outlet port positioned on the lower side.

3. The light source device according to claim 1, wherein the number of outlet ports is four or larger.

4. The light source device according to claim 2, wherein the rotating member rotates by gravity to selectively open and close the plurality of introduction ports.

5. The projector, comprising:

the light source device according to claim 1;

a light modulation device modulating light emitted from the light source device according to image information; and a projection lens projecting the light modulated by the light modulation device.

6. The projector, comprising:

the light source device according to claim 2;

a light modulation device modulating light emitted from the light source device according to image information; and a projection lens projecting the light modulated by the light modulation device.

7. The projector, comprising:

the light source device according to claim 3;

a light modulation device modulating light emitted from the light source device according to image information; and a projection lens projecting the light modulated by the light modulation device.

8. The projector, comprising:

the light source device according to claim 4;

a light modulation device modulating light emitted from the light source device according to image information; and a projection lens projecting the light modulated by the light modulation device.

* * * * *